(12) United States Patent
Kaltchev

(10) Patent No.: US 6,174,435 B1
(45) Date of Patent: Jan. 16, 2001

(54) DEVICE FOR CLARIFYING A CHARGED LIQUID BY FLOTATION

(76) Inventor: Roumen Kaltchev, Les Fourches, 7300 Montagnole (FR)

( * ) Notice: Under 35 U.S.C. 154(b), the term of this patent shall be extended for 0 days.

(21) Appl. No.: 09/237,068

(22) Filed: Jan. 25, 1999

(30) Foreign Application Priority Data

Jan. 30, 1998 (FR) .................................................. 98 01320

(51) Int. Cl.⁷ .............................. C02F 1/24; B01D 21/02
(52) U.S. Cl. ....................... 210/221.2; 210/519; 210/521; 210/522
(58) Field of Search ................... 210/221.2, 221.1, 210/521, 522, 519 525

(56) References Cited

U.S. PATENT DOCUMENTS

| | | | |
|---|---|---|---|
| 3,182,799 | * | 5/1965 | Krofta . |
| 3,754,656 | * | 8/1973 | Horiguchi et al. . |
| 3,862,033 | | 1/1975 | Rozkydalek . |
| 4,089,782 | | 5/1978 | Huebner . |
| 4,120,796 | * | 10/1978 | Huebner . |
| 5,397,472 | * | 3/1995 | Bouchard . |
| 5,662,804 | | 9/1997 | Dufour . |

FOREIGN PATENT DOCUMENTS

| | | |
|---|---|---|
| 4329239 | 3/1994 | (DE) . |
| 0604271 | 6/1994 | (EP) . |
| 0679422 | 11/1995 | (EP) . |
| 1014112 | 8/1952 | (FR) . |
| 1306193 | 2/1963 | (FR) . |
| 2056774 | 5/1971 | (FR) . |
| 2352574 | 12/1977 | (FR) . |
| 929772 | * 5/1982 | (SU) . |
| 971483 | * 11/1982 | (SU) . |

* cited by examiner

Primary Examiner—Thomas M. Lithgow
(74) Attorney, Agent, or Firm—Wall Marjama & Bilinski

(57) ABSTRACT

Apparatus for clarifying by flotation a liquid charged with a solid material that includes a tank for holding a quantity of liquid to be clarified. A plurality of U-shaped components are mounted in said tank below the level of the liquid in a relationship so each component is spaced apart a given distance from an adjacent component. Collectors are mounted in the base of each component to either introduce or remove liquid from the component to establish both a concurrent and countercurrent flow about the walls of the components.

10 Claims, 13 Drawing Sheets

DEVICE FOR CLARIFYING A CHARGED LIQUID BY FLOTATION

TECHNICAL FIELD

The invention relates to a device for clarifying by lamellar flotation. The device according to the invention can be used to accelerate the separation of materials in suspension, referred to hereinbelow by the abbreviation MIS, contained in a liquid, by natural flotation, if their density is less than that of the liquid. The invention can also be used in combination with the technique of flotation with dissolved air. In these two applications, the construction and the operating principle of the device according to the invention are the same.

The common name for clarifiers of this type, using flotation and the lamellar technique, is an inclined-plate float or a lamellar float.

The process and the device described are particularly designed to accelerate the separation of materials in suspension from a liquid effluent.

PRIOR ART

The existing devices of this type use the following techniques:

A/ The Technique of Lamellar Separation.

This technique is used to accelerate the separation of the MIS from a liquid when the density of the MIS is different from that of the liquid. If the density of the MIS is less than that of the liquid, this is referred to as lamellar clarification by flotation. The fundamental theory of lamellar separation and the advantages of this technique will not be described herein, since they are considered as being known.

B/ The Technique of Flotation with Dissolved Air.

This technique is often combined with the technique of lamellar separation. It consists in using the property of microbubbles of air (or of another gas), produced by a suitable device, this property lying in the ability of these microbubbles to adhere to the particles, i.e. to the materials in suspension, present in the liquid, and to entrain them to the surface of the liquid. In this case, this is referred to as a forced flotation.

The principle of the lamellar separation by flotation of the MIS from the liquid will briefly be described below, in support of FIGS. 1 and 2A–2C:

it should be pointed out beforehand that, in the case of the use of the technique of flotation with dissolved air, the device for producing microbubbles of air required for the flotation is not described herein, since it is considered as being known. It is simply assumed that the MIS to be separated from the liquid has a density less than that of the liquid, or else that it is "lightened" by the microbubbles and that it therefore floats.

The liquid charged with floating material is introduced between the inclined plates (1) also referred to as lamellae (FIG. 1). The floating material, represented in the various figures by small circles, travels upwards until it reaches the surface of the top plate of the said lamellae. It then rises by sliding along the plate constituting each of the lamellae, in the direction of the arrow represented by mixed lines (2), up to the top end of each of the said lamellae. On arrival at this point, the floating material detaches from the plate and rises to the surface of the liquid. The space occupied by the particles, and thus liberated, is taken by the clarified liquid, which "slides" along the surface of the bottom plate in the direction of the arrow (3), i.e. in the opposite direction to the upward travel of the floating material, i.e. from the top downwards. Thus, the clarified liquid and the floating material cross between two plates to become separated: the floating material to the top and the clarified liquid to the bottom.

Depending on the direction of the flow of introduction of the liquid to be clarified relative to the lamellae, three types of lamella clarifiers exist:

1/ Co-current Clarifiers (FIG. 2A)

The liquid to be clarified (4) is introduced from the bottom upwards. Between the plates (1), the floating material and the liquid travel in the same direction.

Theoretically, this solution is very advantageous, since the upward travel of the floating material is not perturbed by the movement of the clarified liquid, since the two entities travel in the same direction. In reality, this solution has hardly ever been applied in practice, given the problem associated with removing the clarified liquid. The reason for this is that the floating material and the clarified liquid are recovered on the same side of the lamellae and they readily become remixed in the zone located above the lamellae.

2/ Cross-current Clarifier (FIG. 2B)

The liquid to be clarified is introduced laterally via the side of the device in the direction of the arrow (4), such that the liquid to be clarified and the floating material circulate perpendicularly relative to the direction of introduction. This technique is also rarely used in practice on account of the problems associated with the equal distribution of the flows.

3/ Counter-current Clarifier (FIG. 2C)

The liquid to be clarified is introduced in the direction of the arrow (4) from the top downwards. This technique is by far the one most commonly used in practice, since, in this case, the separation of the floating material and of the clarified liquid is very clear: the floating material is recovered above the lamellae, and the clarified liquid is recovered below the lamellae. Nevertheless, the implementation of this solution comes up against several problems:

in order to increase the total projected surface (TPS) and thus the separation capacity of the float for the same ground surface area, it proves to be necessary to;
reduce the distance between the lamellae; however, the smaller this distance, the greater the friction between the veil of rising floating material and the flow of the descending clarified liquid, which perturbs the upward travel of the floating material;
increase the length of the lamellae in order to be able to increase the rate of passage between the lamellae; in reality, the length of the lamellae depends on the amount of MIS to be removed and on the compactability of the veil of floating material. Lamellae which are too long are easily engorged at the top by an excessively large veil of floating material;
in the space located above the lamellae, the floating material concentrated between the lamellae comes into contact with the liquid to be clarified. Consequently, it is rediluted by the liquid and some of it is once again entrained by the liquid between the lamellae, which decreases the efficacy of the separation.

In practice, these problems are reflected by a decrease in the limit speed of ascent Va=flow rate/TPS applicable on a lamellar float relative to a float with vertical flow. This decrease in the limit speed of ascent depends on several factors:

the flotation speed of the particles: the higher the speed, the more the limit speed of ascent of the lamellar float approaches that of the float with vertical flow;
the concentration of MIS: the higher the value, the more the limit speed of ascent of the lamellar float decreases relative to that of the float with vertical flow;

the compactability of the veil of floating material: the more easily the floating material is compacted, the more the limit speed of ascent of the lamellar float approaches that of the float with vertical flow.

The consequence of these various factors results in the lamellar clarification being used well within its theoretical capacities.

As a guide, in the case of clarification of aqueous effluents by flotation with dissolved air, the maximum theoretical flotation speed is about 18 m/h. In practice, floats with vertical flow are limited to about 8 m/h for the most advanced constructions, while certain lamellar float manufacturers are limited to a limit speed of ascent Va of only 2 m/h, essentially on account of the hydraulic constraints mentioned above.

It emerges from these various observations that co-current clarification makes it possible to rapidly separate large amounts of MIS, but, on the other hand, only achieves a coarse clarification. In contrast, counter-current clarification gives good results for relatively small amounts of MIS, and makes it possible to achieve high-quality clarification. However, this clarification method is greatly influenced by the concentration of MIS in the effluent to be treated.

BRIEF DESCRIPTION OF THE INVENTION

The subject of the invention is to use a clarifier of the type in question, which can use the two techniques under the best conditions for each of them, in co-current and in counter-current respectively, while at the same time overcoming the drawbacks recalled above, and starting, by optimizing their capacities for separating solid materials in suspension in a liquid.

This clarifier includes a plurality of U-shaped components immersed in the clarifier tank, the said components being arranged more or less parallel to each other and separated by a certain distance from each other, and inclined relative to the horizontal, the open part of the "U" facing upwards, each of the said components also receiving, in the region of its base, an inlet or outlet collector.

The manner in which the invention can be implemented and the advantages flowing therefrom will emerge more clearly from the implementation examples which follow, which are given as non-limiting guides, in support of the attached figures.

DETAILED DESCRIPTION OF THE DEVICE ACCORDING TO THE INVENTION

Figure 1:
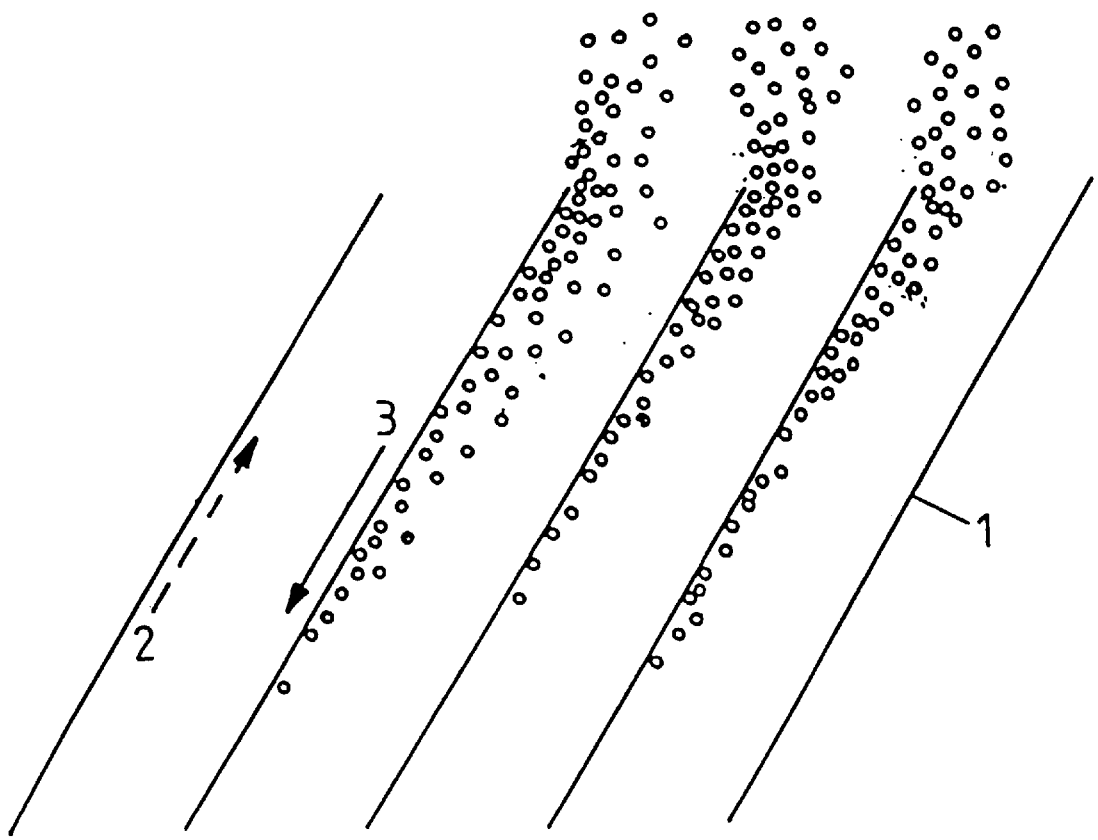
FIG. 1 schematically represents the general principle of lamellar separation by flotation.
Figure 2A:
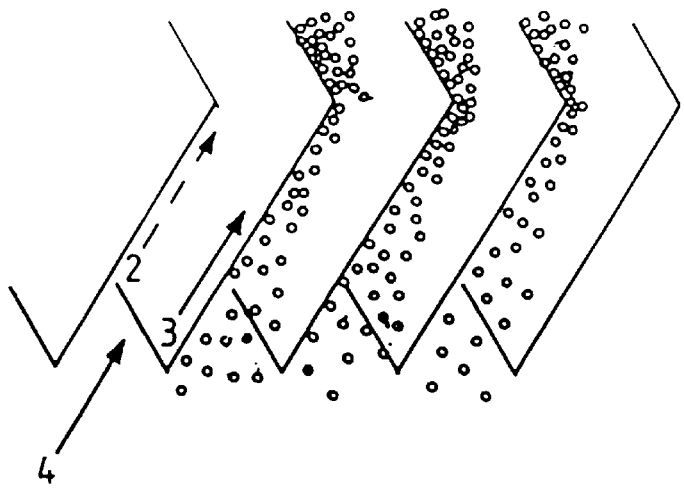
FIGS. 2A, 2B and 2C schematically represent the three types of lamellar clarification by flotation as a function of the direction of introduction of the liquid to be clarified.
Figure 2B:
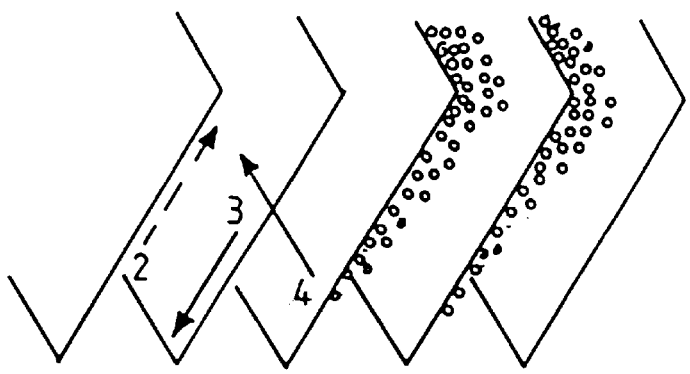
Figure 2C:
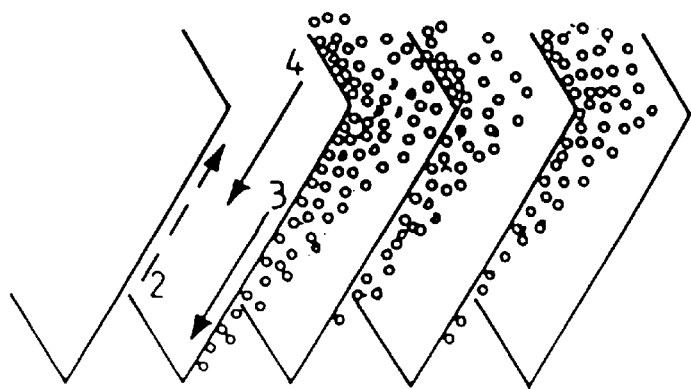

The device according to the invention makes it possible simultaneously to carry out two techniques of lamellar separation by flotation, operating in co-current and then in counter-current, respectively.

According to a first characteristic of the invention, the clarifier includes several (at least two) U-shaped components (11), inclined at an angle α relative to the horizontal, and immersed in the tank (10) as can clearly be seen in FIGS. 3A–3D, and thus positioned under the surface of the liquid. Each component (11) is equipped with a collector (12) placed at the base of the component on the side of its closed end. These collectors typically consist of a tubular component which is open along one of its generatrices. The components (11) are arranged in rows at a certain distance from each other.

The distance separating the two arms of each of the components (11) is chosen such that it is sufficient to allow a separation between the floating material (5) and the clarified liquid. It is also pointed out that, even though the distance separating two successive components (11) is not necessarily equal to the distance separating the two arms of the same component, it is nevertheless chosen such that it satisfies the same condition, i.e. it is sufficient to allow separation between the floating material (5) and the clarified liquid. As a guide, in practice, the distance between the arms or plates of the U-shaped components (11) is between 5 and 15 cm.

Figure 7A:
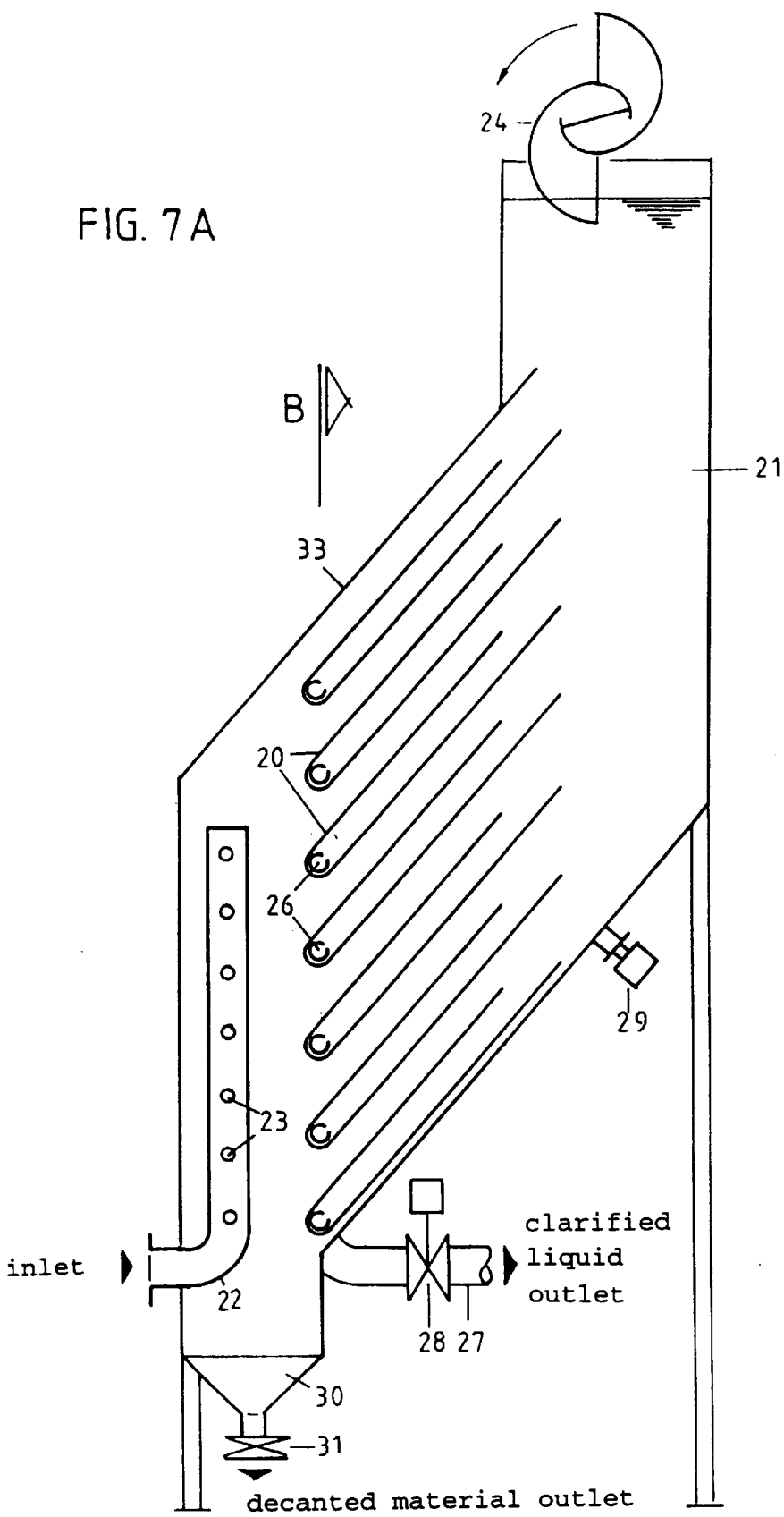
FIG. 7A represents a schematic view in longitudinal cross section of another embodiment of the flotation clarification apparatus equipped with the device according to the invention, with a vertical configuration of the U-shaped components.
Figure 7B:
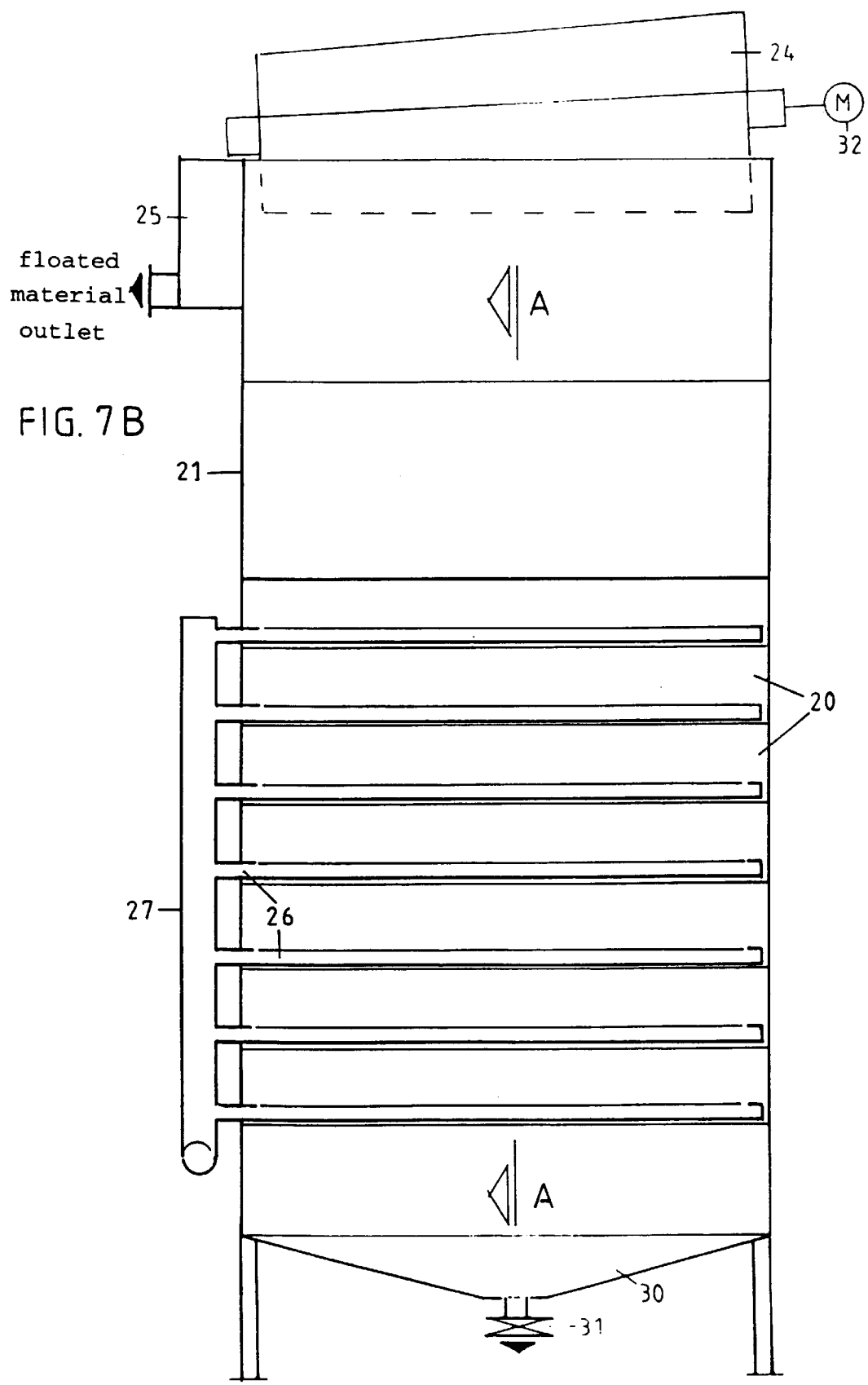
FIG. 7B represents a schematic view in transverse cross section of the apparatus shown in FIG. 7A.
Figure 7C:
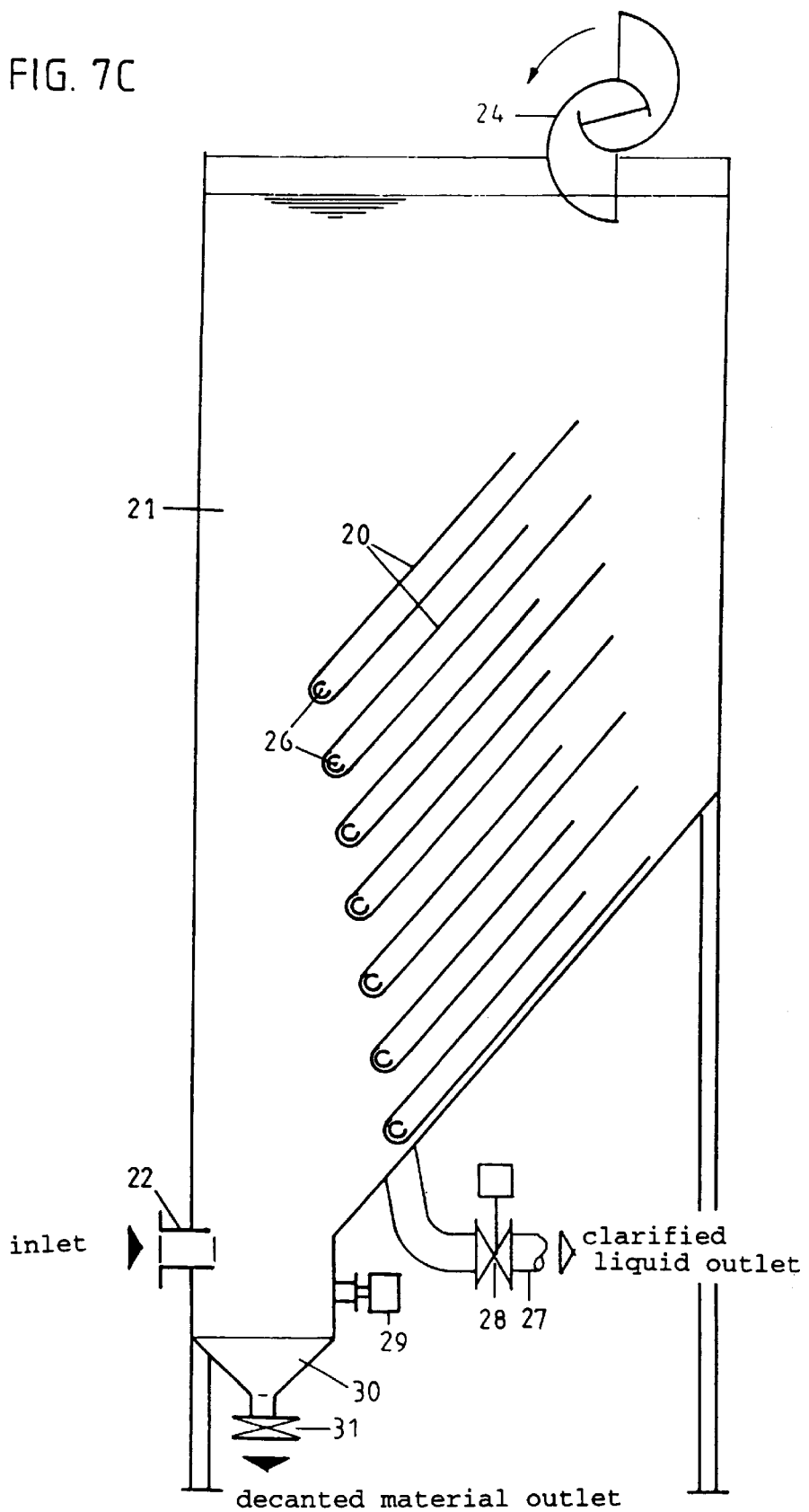
FIG. 7C represents a schematic view in longitudinal cross section of a variant of the apparatus shown in FIG. 7A.

As can be seen in the figures, these components can be in a configuration in a horizontal row (FIG. 3A, 3B), in a vertical column (FIG. 3C, 3D) or in a vertical column with a horizontal offset between one component and the next (FIG. 7C).

The closed end of each of the components (11) faces downwards, and the open end faces upwards.

Figure 3A:
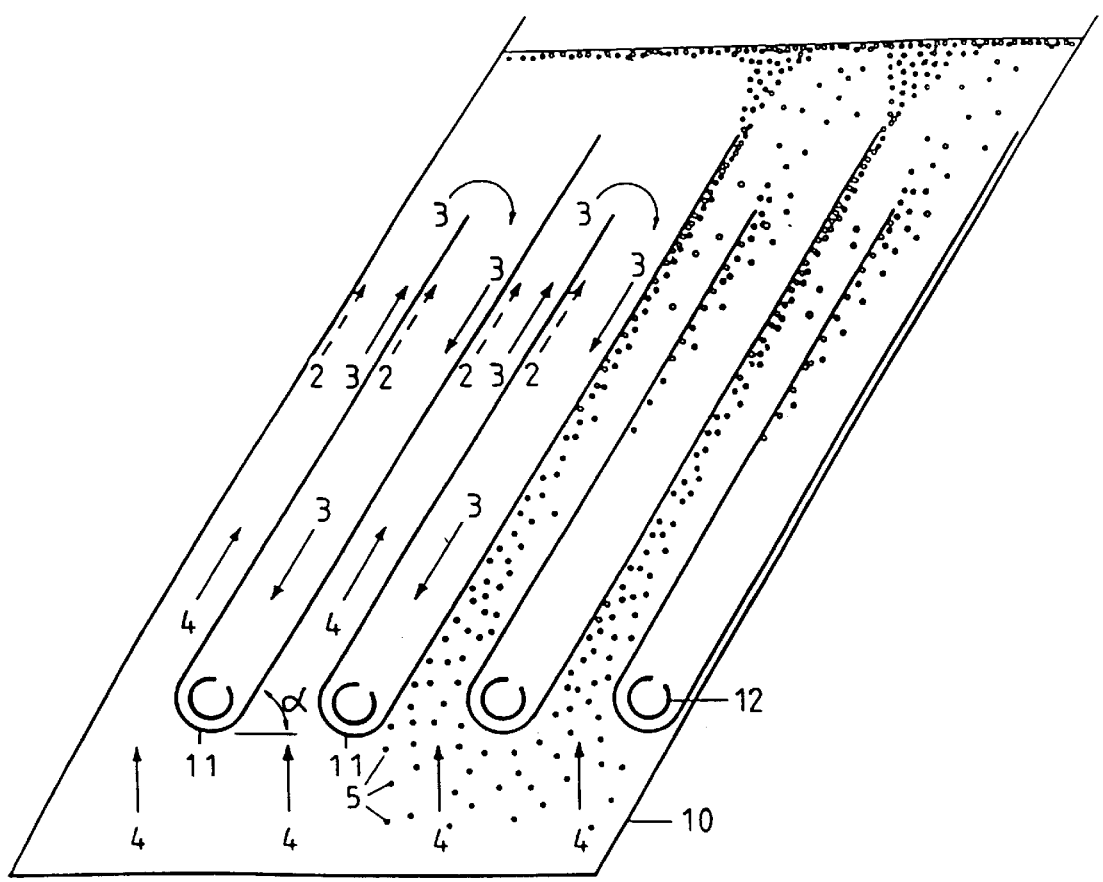
FIG. 3A schematically represents the principle of the device according to the invention in the case of a clarification by flotation with introduction of the liquid to be clarified between the U-shaped components and removal of the liquid to be clarified inside at the base of the components.
Figure 3B:
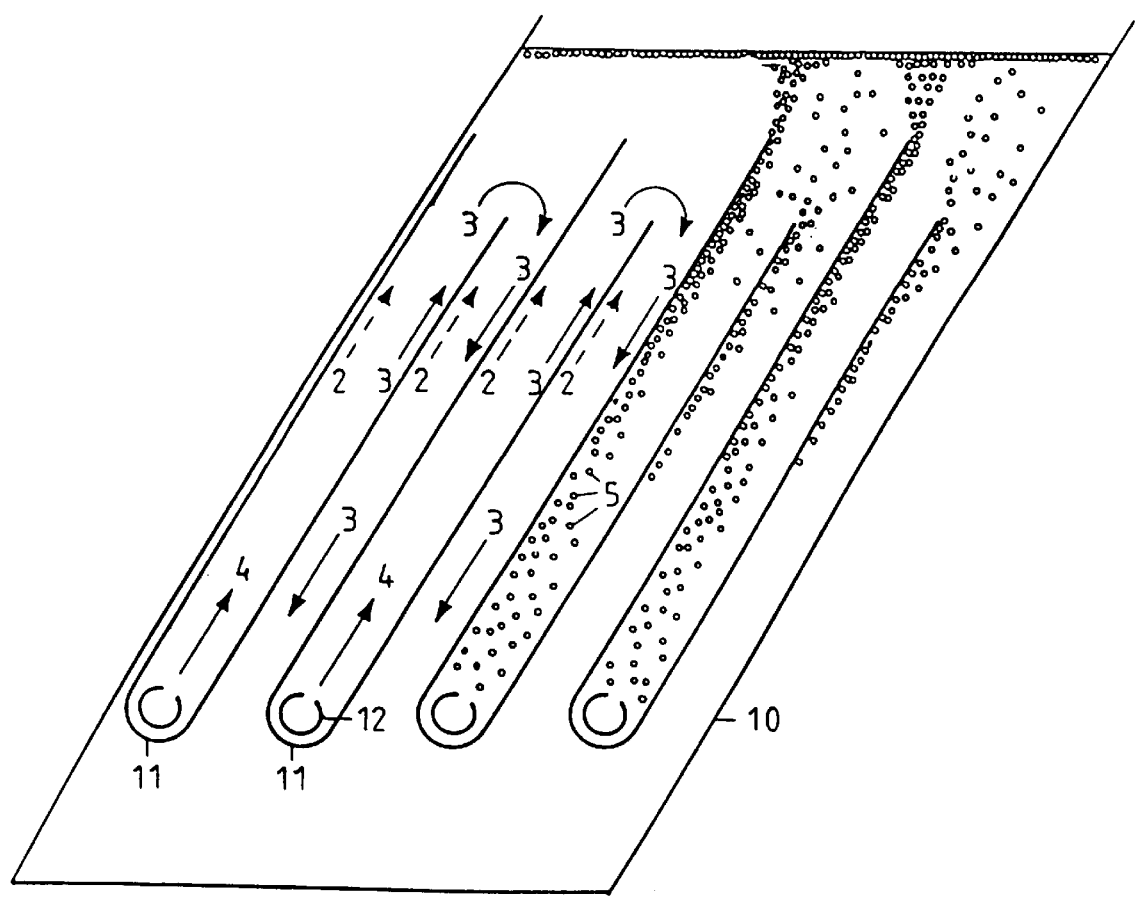
FIG. 3B schematically represents the principle of the device according to the invention in the case of a clarification by flotation with introduction of the liquid to be clarified inside at the base of the U-shaped components and removal of the liquid to be clarified between the components.
Figure 3C:
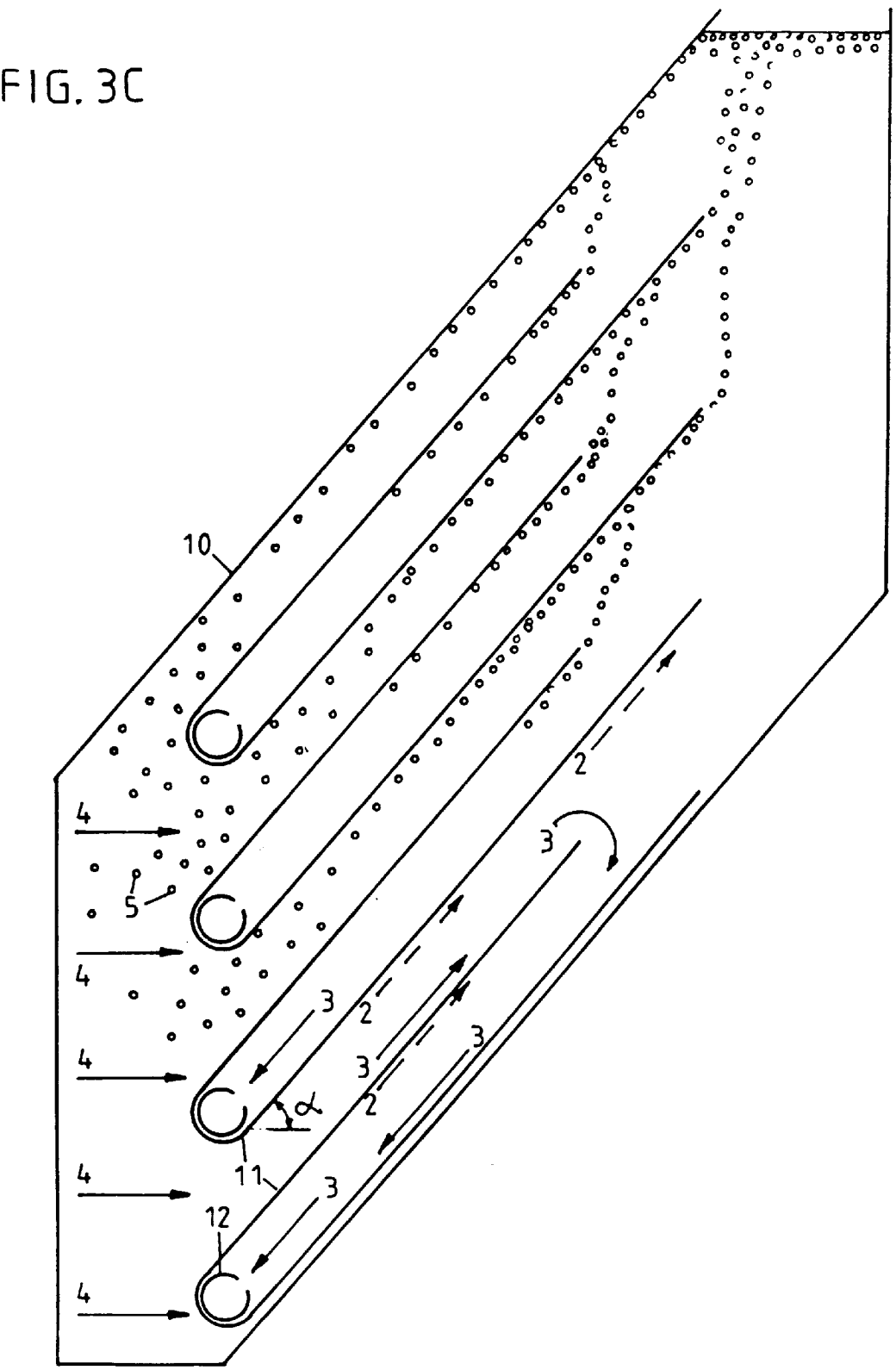
FIG. 3C schematically represents a principle similar to the one described in FIG. 3A, but with a vertical column of U-shaped components.

The device according to the invention can operate in two different configurations:

Configuration 1 (FIGS. 3A, 3C)

The liquid to be clarified is introduced into the space outside the components (11) on the side of their closed end.

It penetrates between the components (11) in the direction of the arrow (4) until it reaches the bottom of the components (11). Between the said components (11), the floating material (5) rises until it touches the lower outer wall of the components (11) and then slides upwards along the said wall. On arriving at the top end of the components (11), the floating material is evacuated towards the surface of the liquid located above the components (11). The liquid (totally or partially clarified) also rises from the bottom upwards in the direction of the arrow (3). In this part of the liquid's path, the clarification takes place according to the "co-current" principle.

Next, the liquid (totally or partially clarified) descends inside each component (11) from the top downwards in the direction of the arrow (3), where a second separation takes place according to the "counter-current" principle. The floating material (5) rises along the top wall of the said components, but inside each of them, in the direction of the arrow (2). The clarified liquid is collected at the bottom of each component (11) by the collector (12) with which it is fitted, and is removed from the clarifier tank (10).

Figure 3D:
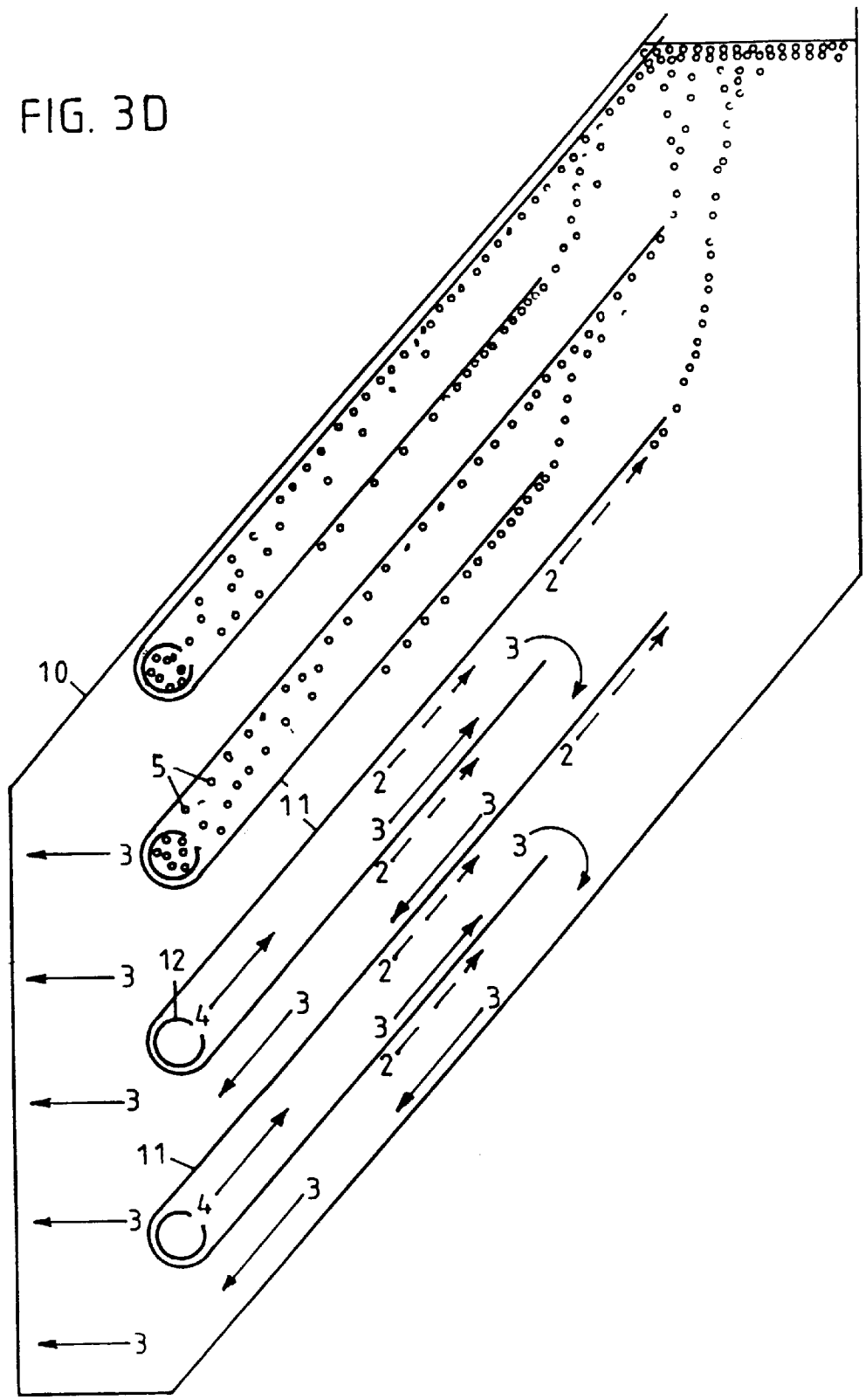
FIG. 3D schematically represents a principle similar to the one described in FIG. 3B, but in this case the array of U-shaped components is vertical.

Configuration 2 (FIGS. 3B–3D)

The liquid to be clarified is introduced into the tank (10) inside each component (11) by way of the collector (12). It rises inside the components (11) from the bottom upwards in the direction of the arrow (4) until it reaches the top part of the said components. Inside the components (11), the floating material (5) rises until it reaches the top inner wall of the components (11), and then slides along the said wall. On arriving at the top end of the components (11), the floating material is evacuated towards the surface of the liquid located above the components (11). The liquid (totally or partially clarified) also rises from the bottom upwards in the direction of the arrow (3). In this part of the liquid's path, the clarification takes place according to the "co-current" principle.

Next, the liquid (totally or partially clarified) descends between the components (11) from the top downwards in the direction of the arrow (3), where a second separation takes place according to the "counter-current" principle. The floating material (5) rises along the outer bottom wall of each component in the direction of the arrow (2). The clarified liquid is collected in the space located on the side or below the closed end of the components (11), to be removed from the clarifier tank (10).

The functioning of the clarification device according to the invention is closely associated with the construction and implementation of the U-shaped components (11). The closed side of the components is systematically located on the inlet side of the liquid to be clarified. The base of the elements is located at the bottom and the open side at the top, as has already been stated. The space located inside the components (11) is delimited vertically by the two inclined walls which constitute the arms of the "U", and laterally either by the two opposite walls of the clarifier tank (10) or by walls incorporated into the component. In this way, each component encloses a space, the only route of access into which is via the open side located above the said components. This arrangement of the components of the device according to the invention makes it possible to circulate the liquid between the components from the bottom upwards and then inside each component (11) from the top downwards according to the configuration 1 given in FIGS. 3A and 3D. According to configuration 2 given in FIGS. 3B and 3D, the liquid first circulates inside the components from the bottom upwards and then between the components from the top downwards.

Irrespective of the configuration used, it concerns the same device using the same clarification process. The clarification device according to the invention can thus function in the two directions.

The inclined U-shaped components can be used in several ways: they can be fixed to the clarifier tank (10) (FIGS. 3A, 3B, 3C, 3D). Each component (11) can be independently fixed in the clarifier tank (10). Where appropriate, two or more components (11) can form a block. The components 11 can also be supported by a support outside the clarifier tank.

Figure 6A:
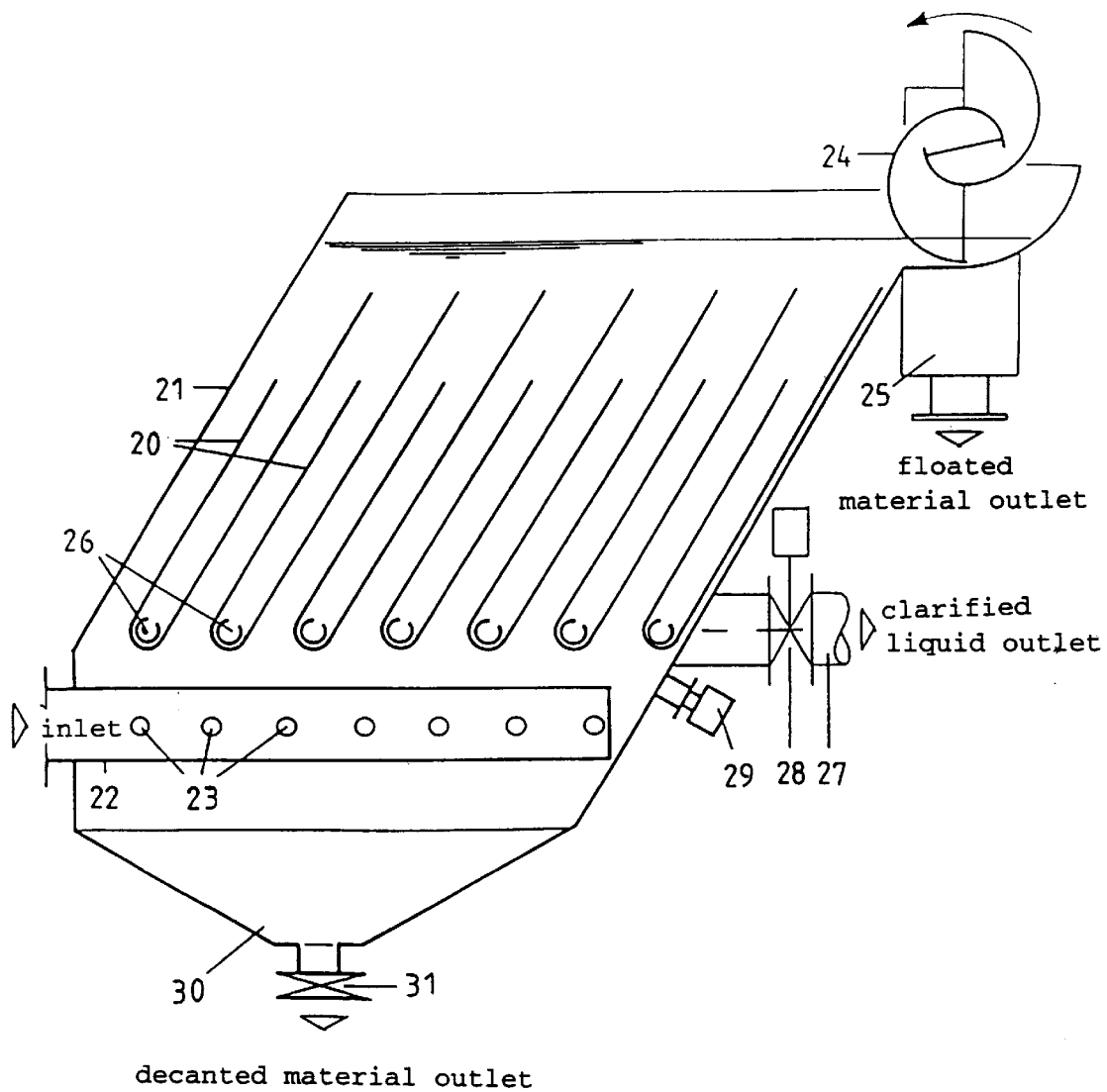
FIG. 6A represents a schematic view in longitudinal section of a flotation clarification apparatus equipped with the device according to the invention, with a horizontal array of U-shaped components.

In addition, the U-shaped components (11) can be in a horizontal configuration, in which they are oriented parallel to each other at the same height in the tank (10) (FIGS. 3A, 3B, 6A). They can also be in a vertical configuration, in which they are oriented parallel to each other and above one another (FIGS. 3C, 3D, 7A). Lastly, they can be in a so-called inclined configuration, in which they are oriented parallel to each other and above one another, while at the same time being offset by a certain amount along an inclined line (FIG. 7C). Irrespective of the configuration selected, the closed side of each component always remains below its open side.

The components (11) can be made of metal, plastic, cloth, ceramic or any other flat or profiled, rigid or flexible material. Where appropriate, the components (11) can consist of several different parts forming an assembly.

The walls of each component (11) can be straight or curved, and parallel or non-parallel. The walls of each component can have the same length or different lengths (in FIG. 4; $L_1=L_2$ or else $L_1<L_2$ or alternatively $L_1>L_2$).

Figure 4:
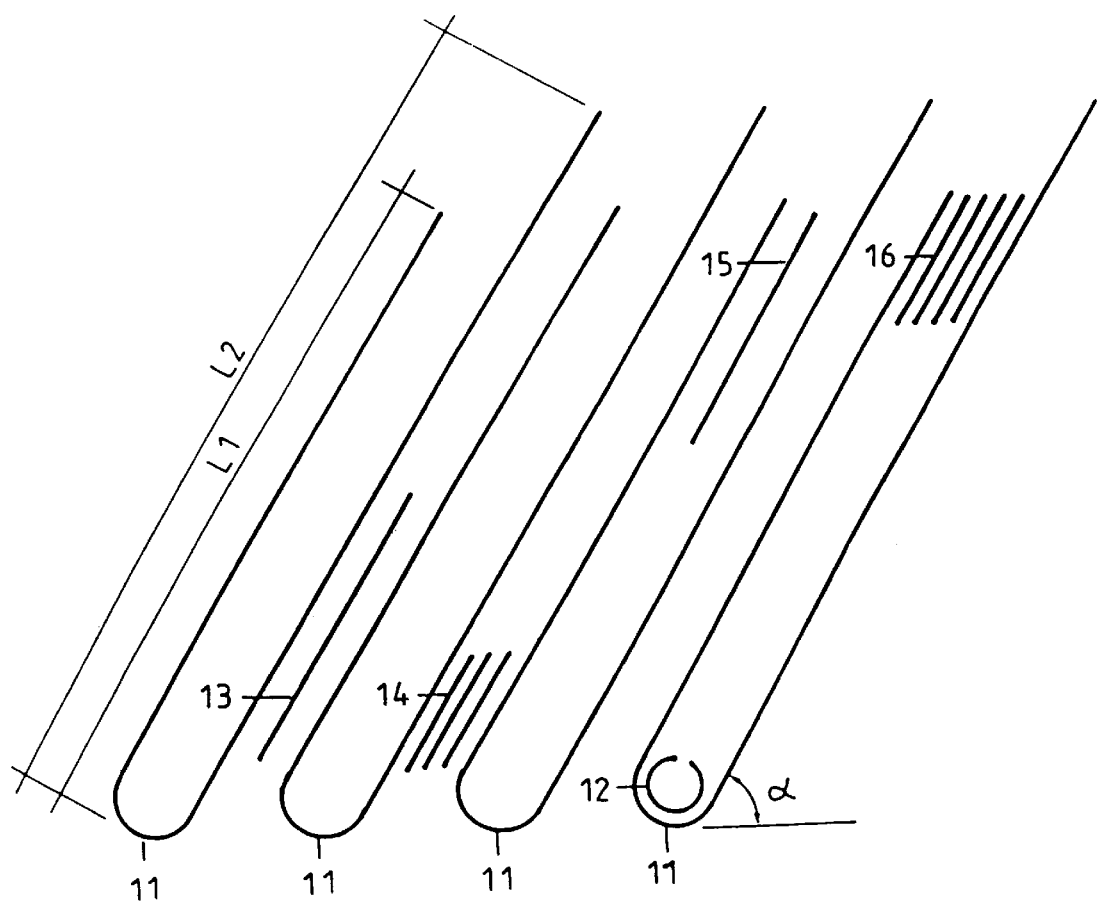
FIG. 4 shows a few optional components which can be combined with the device according to the invention.

One or more parallel plates (13, 14) can be installed between the components (FIG. 4). Similarly, one or more parallel plates (15, 16) can be installed inside the components (FIG. 4). These plates are also positioned parallel to the arms constituting the components (11) and are intended to attenuate any tranverse turbulence which may arise at the inlet or between the components (11), and to orient the flows more appropriately.

The components (11) are inclined at a certain angle α relative to the horizontal. Where appropriate, they can be oriented vertically. The clarified liquid can be collected at the base of each component (11) by a collector (12) incorporated inside the component, or else by simple connections at the base of the component.

Figure 5A:
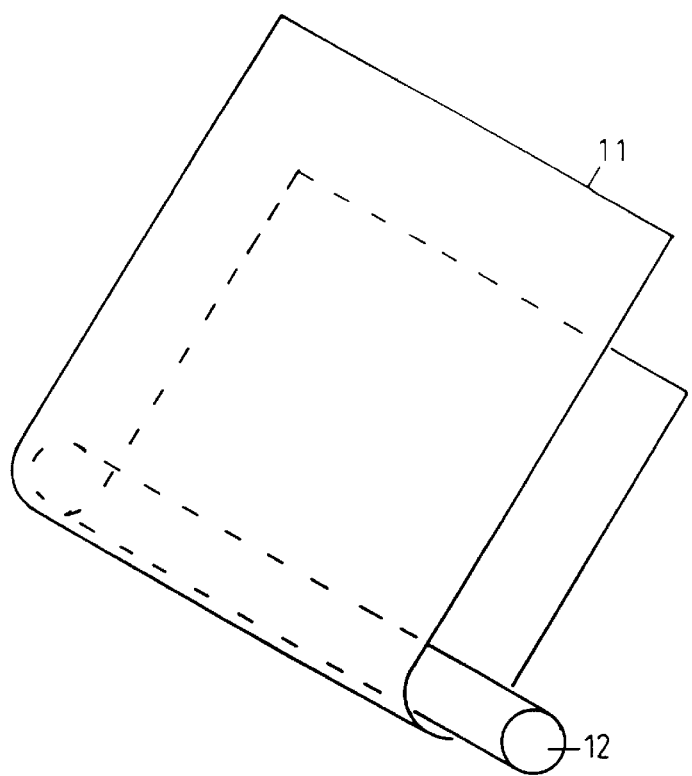
FIG. 5A shows a component according to the invention without side partitions. In this case, it is the walls of the clarifier tank which close the U-shaped component on the two sides.

Each component (11) can be open laterally on the two sides (FIG. 5A). In this case, the wall of the clarification tank (10) will itself serve to separate the outer space from the inner space of the component.

Figure 5B:
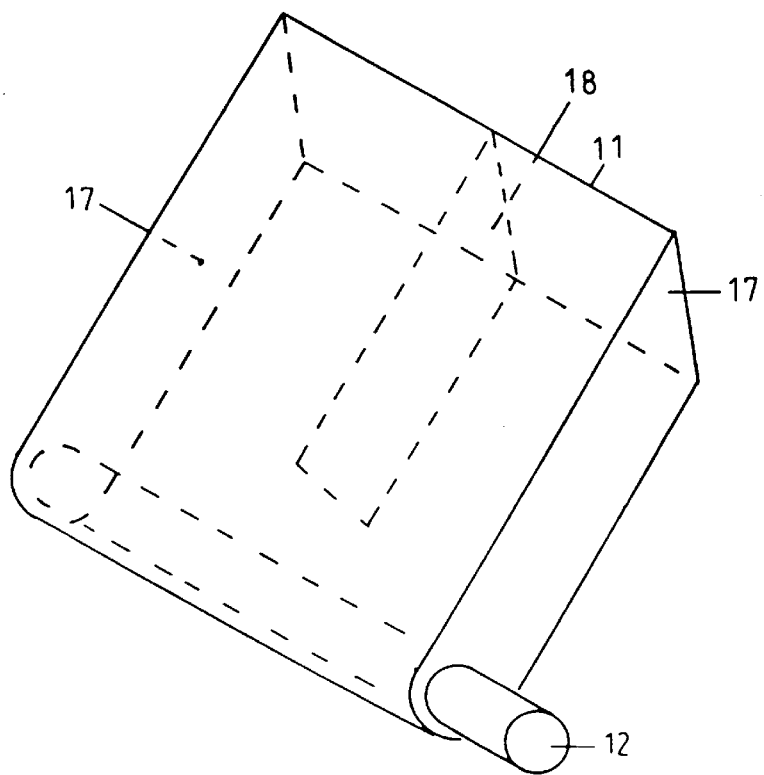
FIG. 5B shows a component according to the invention with side partitions solidly attached to the U-shaped component.

Each component (11) can be closed laterally on the two sides with a wall (17) and may or may not include ribs (18) (FIG. 5B). In this case, it is understood that the distance between the walls (17) and the tank (10) of the clarifier is sufficiently small, so as to avoid passage of the liquid between the walls (17) and the wall of the clarifier, such that all the liquid to be clarified passes between the components (11).

FIG. 7C represents a variant of the clarifier in accordance with the invention represented in FIG. 7A. Relative to the latter clarifier, it is first observed that the column of U-shaped components (20) is not vertical, but inclined. Next, the distribution collector (22) is replaced with a simple connection located at the base of the clarifier tank (21). Lastly, the column of components (20) is not limited at the top by a wall (33), which is removable here, such that all the liquid to be clarified is not forced to pass between the components (20): indeed, some of the floating material can escape directly towards the surface of the liquid without passing between the components.

The number of components (11, 20) depends on the size of the clarifier and is unimportant in this example. The liquid to be clarified is introduced via the inlet collector (22). The liquid to be clarified enters the clarifier tank (21) on the side of the closed end of the said components (20) through orifices (23) made on the inlet collector (20) (FIGS. 6A, 6B, 7A) or else directly into the clarifier tank (21) (FIG. 7C). The floating material rises to the surface of the liquid according to the principle described above and illustrated with reference to FIGS. 3A and 3C. Once it has accumulated at the surface of the liquid, the floating material is removed, for example by means of a spiral scoop (24) towards an outlet container (25). The scoop is made to rotate by an external drive (32). The floating material can also be removed using a surface scraper, by simple overflow into a sluice or by another means.

The clarified liquid descends inside the components (20) and is collected by the perforated collectors (26) and evacuated towards the outlet collector (27). The level of liquid in the clarifier tank (21) is regulated by a regulation valve (28) controlled by a pressure detector (29).

If the liquid contains decantable material in addition to the floating material, this decantable material is recovered at the base of the upturned pyramid (30) forming the base of the clarifier tank. At this point, they are periodically purged by an automatic or manual valve (31). The decantable material can also be collected by means of a base scraper or by any other means.

Figure 6B:
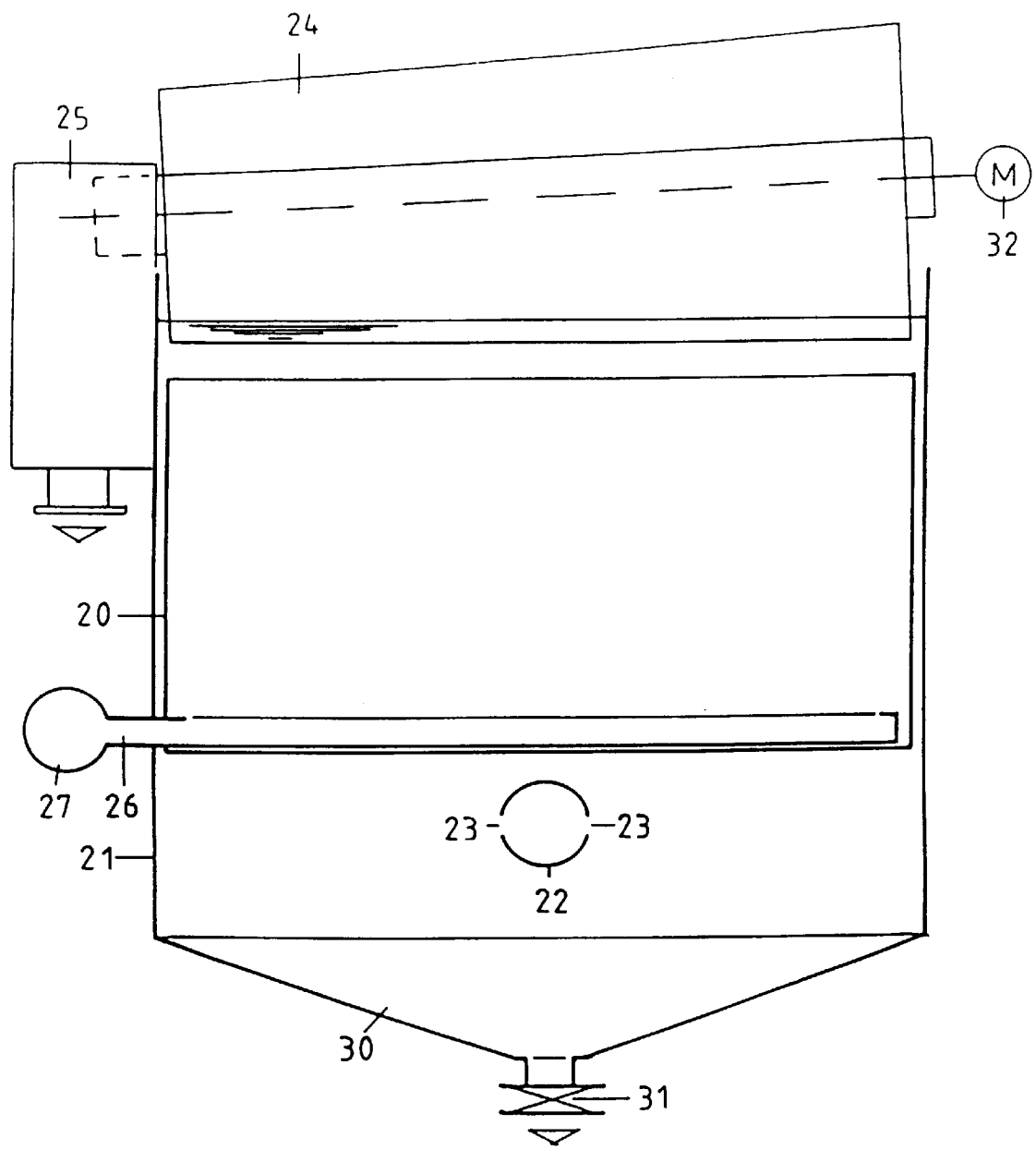
FIG. 6B represents a schematic view in transverse cross section of the apparatus shown in FIG. 6A.

As a guide, the main dimensions of the clarifier described with reference to FIGS. 6A and 6B can be in the following order of magnitude:

total length: 3 m total width: 2.5 m total height: 3 m.

The U-shaped components are inclined at 55° relative to the horizontal.

As a guide, the main dimensions of the clarifier described in reference to FIGS. 7A, 7B and 7C can be in the following order of magnitude:

total length: 2 m total width: 2.2 m total height: 4 m.

The U-shaped components are inclined at 50° relative to the horizontal.

The flotation may be natural or forced. In the latter case, the flotation will be brought about by microbubbles of gas (air or other gas) produced by an external device not described, and introduced into the inlet collector (22) upstream of the apparatus.

With a few minor modifications, the devices described above can also function in the opposite sense, i.e. according to configuration 2 illustrated with reference to FIGS. 3B and 3D. Thus, the liquid to be clarified would be introduced via the collector (27) and distributed inside the components (20) by the collectors (12). The level-regulator valve (28) would be installed on the collector (22). The bottom wall of the components (20) would, in this case, be shorter than the top wall.

The advantage of the device in accordance with the invention can consequently be appreciated, in the context of the treatment of liquid effluents and wastewaters. The reason for this is that, besides optimizing the functioning of the clarification, it is possible to significantly reduce the bulk of such devices.

What is claimed is:

1. Apparatus for clarifying by flotation a liquid charged with a solid material that includes:

a tank for holding a quantity of liquid to be clarified, a plurality of U-shaped elements each having a pair of side walls, each of said elements being mounted in said tank at an angle so that each element has a lower end and an upper end;

an end wall that extends laterally between the side walls of each element for closing the lower end of each of said elements;

said elements being mounted in said tank in a relationship so that a side wall of one element is spaced apart from a side wall of an adjacent element a given distance, distribution means for introducing the liquid to be clarified into said tank outside said elements;

collector means mounted in the lower closed end of each element for removing clarified liquid from said element so that a co-current flow of clarified liquid and liquid containing solid material is established along the side walls of adjacent element and a counter-flow of clarified liquid and liquid containing solid materials is established by the side walls of each element as clarified liquid is removed from the elements by said collector means.

2. The apparatus of claim 1 wherein the side walls of the U-shaped elements are inclined with regard to a horizontal plane.

3. The apparatus of claim 1 wherein the side walls of the U-shaped elements are parallelly aligned in a vertical column, one above the other.

4. The apparatus of claim 1 wherein the side walls of the U-shaped elements are inclined upwardly in parallel alignment in a vertical column within said tank.

5. The apparatus of claim 1 wherein the side walls of said U-shaped elements are mounted in parallel alignment in a horizontal column within said tank.

6. The apparatus of claim 1 wherein the space between the side walls of each element is about equal to the space between the side walls of adjacent components.

7. The apparatus of claim 1 wherein each element is a box having enclosing side walls and end walls and being open at the top.

8. The apparatus of claim 1 wherein the U-shaped elements are fabricated from a material selected from the group consisting of metal, plastic, ceramics, cloth or a mixture of these materials.

9. The apparatus of claim 1 that further includes one or more plates that are mounted inside the elements between the side walls of the elements.

10. The apparatus of claim 1 that further includes one or more plates that are mounted in the spaces between adjacent U-shaped components.

* * * * *